Oct. 2, 1928.

B. T. WILLISTON 1,686,057

HIGH PRESSURE GATE VALVE

Original Filed May 13, 1924

Inventor
Belvin T. Williston
by Roberts Cushman & Woodberry
Att'ys

Patented Oct. 2, 1928.

1,686,057

UNITED STATES PATENT OFFICE.

BELVIN T. WILLISTON, OF SOMERVILLE, MASSACHUSETTS, ASSIGNOR, BY MESNE ASSIGNMENTS, TO CONSOLIDATED ASHCROFT HANCOCK COMPANY, OF NEW YORK, N. Y., A CORPORATION OF DELAWARE.

HIGH-PRESSURE GATE VALVE.

Continuation of application Serial No. 712,950, filed May 13, 1924. This application filed May 3, 1926. Serial No. 106,205.

This invention pertains to valves and relates more particularly to gate valves of the type employed for controlling the flow of high pressure fluids, for example, superheated steam, the present application being a continuation of my application Serial No. 712,950, filed May 13, 1924.

One of the most important characteristics of an acceptable valve of the above type is its ability to withstand high pressure without substantial leakage. Other and important desiderata in such a valve are rapidity and ease of opening and closing; the provision of a free and substantially unobstructed fluid passage when the valve is fully open; protection of the seat-engaging element of the valve from the erosive action of the fluid or entrained particles of grit when the valve is partially or fully open; capability of the seat-engaging element to bear firmly and squarely against the seat even though the latter is not exactly perpendicular to the normal path of movement of the seat-engaging element; and ease of replacement of the seat and the seat-engaging element when worn.

The principal object of the present invention is to provide a valve having all of the above desirable characteristics combined in a simple, sturdy and durable construction which may be manufactured at relatively low cost, and in a wide range of sizes.

With this object in view the invention comprises means such, for example, as a screw of relatively steep pitch for moving the valve head transversely toward and from the fluid passage, together with cam devices operable to move the seat-engaging element of the valve head directly against or away from the seat when in alignment with the latter. The valve seat and the seat-engaging element of the head are both removable for replacement; the seat-engaging element of the head is free to tip slightly to permit it to accommodate itself to a seat which is out of true, and such seat-engaging element is held within a housing which partakes of the movement of the seat-engaging element and protects the latter from the abrasive action of the fluid in all positions of adjustment.

Figure 1:
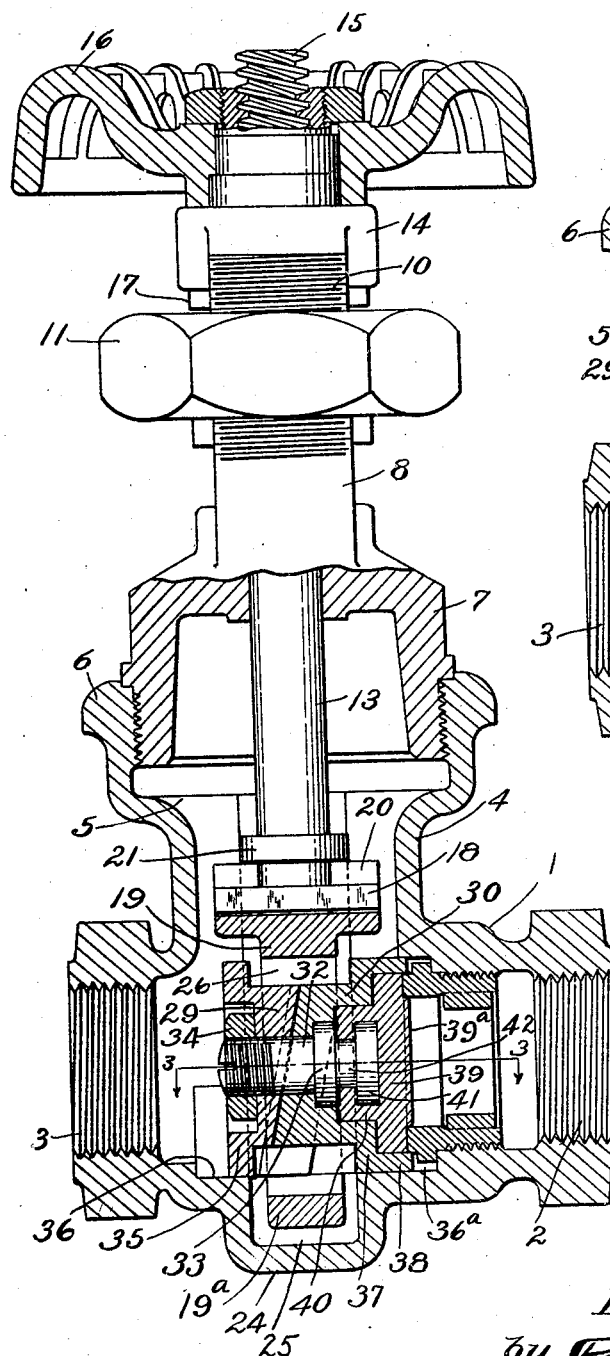
Figure 2:
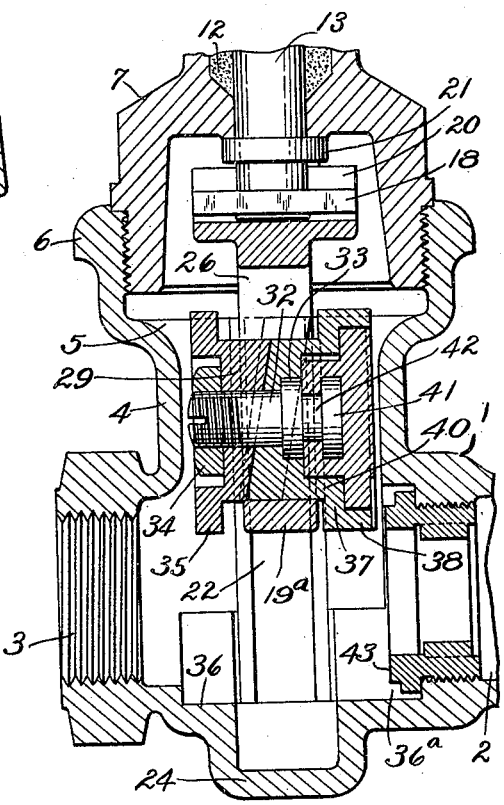
Figure 3:
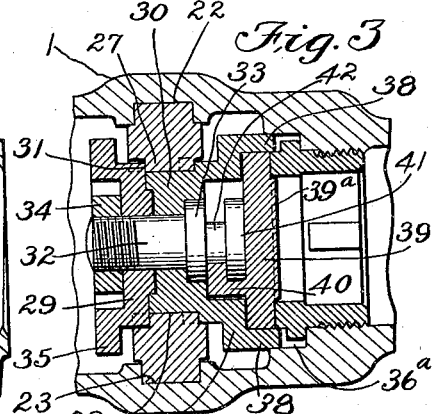

One specific embodiment of the invention is illustrated in the accompanying drawings by way of example and in such drawings Fig. 1 is a vertical section through a gate valve structure embodying the present invention, a portion of the valve structure being shown in elevation and parts being broken away, the valve being closed;

Fig. 2 is a fragmentary section similar to Fig. 1, but with the upper part of the valve structure broken away and showing the valve in open position; and Fig. 3 is a fragmentary horizontal section substantially on the line 3—3 of Fig. 1.

Referring to the drawings the numeral 1 designates the valve casing having the inlet opening 2 and the outlet opening 3. These openings are preferably aligned with one another and are connected by a fluid passage within the casing.

The casing is provided with an offset portion 4 at its upper side providing a chamber 5 forming a lateral extension of the fluid passage and which receives the valve head when the valve is open. The part 4 terminates in an annular internally screw-threaded flange 6 which receives the threaded plug 7. This plug is furnished with diametrally opposed upstanding brackets 8, of which but one is shown, these brackets being provided with screw threads 10 on their outer surfaces for engagement by a nut 11 employed for compressing the packing material 12 in a stuffing box formed in the plug 7.

Aligned with the stuffing box is a bearing for the axially-movable non-rotating stem 13 by means of which the valve is actuated as hereinafter described. The upper part of this stem is guided in a collar 14 which unites the upper ends of the brackets 8. The stem 13 is externally screw-threaded as shown at 15, the pitch of the screw-thread preferably being relatively steep to provide for rapid opening and closing of the valve. The hub of the hand wheel 16 has threaded engagement with the stem 13, such hub extending downwardly through collar 14 and being provided with a flange 17 at its lower end to prevent axial movement of the hand wheel. Rotation of the latter thus moves the stem in an axial direction.

The lower end of the stem 13 is furnished with an enlargement 18, preferably of elongate rectangular form, which is seated in an undercut groove in the upper end of a sliding carriage 19. This undercut groove is formed between flanges having overhanging lips, of which one is indicated at 20, and the stem 13 is provided with a radial flange 21 which bears against the upper surfaces of these lips so that the carriage 19 is constrained to move with the stem 13 in either direction.

The opposite edges of the carriage 19 slide in parallel guide slots 22 and 23 (Fig. 3) in the opposite sides of the casing 1, such slots being of a length to permit the carriage to move from the position such as shown in Fig. 1 to a position such as indicated in Fig. 2. These slots are substantially perpendicular to the axis of the fluid passage in the casing so that the carriage moves transversely across said passage. In order to permit the carriage to move to the position shown in Fig. 1 the lower wall of the casing is preferably provided with an offset portion 24 providing a chamber 25 for the reception of the lower end 19ª of the carriage.

The carriage is furnished with a vertically elongate slot 26, the opposite walls of which are provided with parallel inclined cam ribs 27 and 28 respectively. A movable valve head is disposed within the slot 26 in the carriage, such head comprising a pair of cylindrical sleeve members 29 and 30 which are disposed in end-to-end relation and connected by a bolt 32. This bolt has a head 33 seated in a suitable cavity in the outer end of the member 30 and is screw-threaded at its opposite end for the reception of a nut 34 which is seated in a cavity in the outer end of the member 29.

The meeting ends of the sleeve members 29 and 30 are bevelled or inclined to form complemental surfaces, the inclination thereof being the same as that of the cam ribs 27 and 28 of the carriage. Adjacent to its inclined end face the sleeve 30 is furnished with rabbets on its opposite sides, the edges 31 of the inclined face of the opposed member 29 overlapping such rabbets as indicated and combining therewith to form inclined cam grooves in the opposite sides of the head to receive the cam ribs 27 and 28 respectively of the carriage.

The outer end of the member 29 is furnished with a radial flange 35 of greater diameter than the body of member 29, such flange constituting a stop member to limit downward movement of the valve head. This stop cooperates with a finished arcuate surface 36 at the lower part of the casing. This surface is concentric with the axis of the fluid passage and at the inlet end of the casing completely encircles the fluid passage, forming the recess 36ª surrounding the valve seat.

The sleeve member 30 is also furnished with a radial flange 37 at its outer end of the same diameter as the flange 35. The flange 37 is provided with an axially extending lip 38, which together with the flange constitutes a housing providing a shallow cup-like cavity or chamber for the reception of the valve disc 39.

The valve disc 39 is provided with a flange 40 (Fig. 2) projecting from its inner or rear face, such flange having an inwardly directed lip to provide a socket for the reception of an enlarged supplemental head 41 on an axial extension 42 projecting from the head proper of the bolt 32. The enlargement or head 41 constitutes a retainer for holding the valve disc 39 within the housing, the wall of the socket in which said enlargement is seated being cut away at one side to permit the disc readily to be detached from the bolt when it is desired to replace it. The socket is of such size relatively to the head 41 that the disc 39 is free to tilt or tip slightly relatively to its housing. The outer face of the valve disc 39 is preferably furnished with a low boss 39ª at its center projecting slightly from the annular seat-engaging face of the disc. This annular seat-engaging face cooperates with an annular valve seat 43 concentric with the inlet passage 2 to close the fluid passage through the casing. The boss 39ª acts in a manner well known in valve structures to keep the valve seat free of particles of grit or dirt carried by the fluid.

The valve parts occupy substantially the position shown in Fig. 2 when the valve is open. In this position the outer or seat-engaging face of the disc 39 lies in a vertical plane spaced from the plane of the valve seat 43. The valve disc 39 is disposed within the housing comprising the flange elements 37 and 38, so that its edges are not exposed to the action of the fluid flowing through the casing, while the seat-engaging face of the disc lies closely adjacent to the inner wall of the casing within the chamber 5, where it is protected to a very substantial extent from the action of the moving fluid.

In closing the valve the hand wheel 16 is manipulated to move the stem downwardly. During the early portion of this movement the head with its disc 39 moves vertically down with the carriage, its weight being supported by the lower end 19ª of the carriage. This movement continues until the valve head is substantially aligned with the axis of the fluid passage. At this moment the edges of the flanges 35 and 37 contact with the finished surface 36, thus preventing further downward movement of the valve head. The downward motion of the carriage being continued the cam ribs 27 and 28 force the valve head to move to the right in an axial direction (as viewed in Fig. 1) until the seat-engaging surface of the disc 39 is brought into contact with the valve seat. This latter movement of the valve head is relatively small and the inclination of the cam ribs is so chosen that during this movement of the valve head great force may easily be applied in compressing it firmly against its seat.

The valve seat and surrounding parts are preferably so arranged that when the disc 39 is fully seated the edges of the flange 38 of the disc housing enter between the outer wall of the valve seat and the walls of the concentric recess 36ª.

When the valve is to be opened the hand wheel is turned in the opposite direction thus lifting the stem 13 with the carriage 19. During the first portion of this movement the engagement of flange 38 with the walls of recess 36ª prevents upward movement of the valve head and thus the cam ribs 27 and 28 cause the valve head to move axially away from the seat until the housing is clear of the inner walls of the casing whereupon the valve head partakes of the upward movement of the carriage and is moved transversely from out the fluid passage, to the position shown in Fig. 2.

In the arrangement described the valve head and associated parts may be moved rapidly toward and from closing position, while at the same time the valve disc may be caused to bear with great pressure against the valve seat so as to avoid all possibility of leakage. When closed and subjected to pressure such pressure is carried directly by the side walls of the casing through the cam ribs 27 and 28 and the carriage, so that the valve stem is not subjected to excessive pressure or tendency to bend it or throw it out of true. Moreover, as the valve disc 39 is losely connected to the valve head it is capable of tilting or swinging slightly relatively to the axis of the head, so that if the valve seat is not exactly true the valve disc may seat firmly thereagainst without imposing strain upon the parts.

The various parts of the device are so designed that the necessary machine work may be performed readily and without the assistance of special tools or fixtures so that the cost of production is relatively low, while the device is such as to lend itself to embodiment in valves of a wide range of sizes and for a great variety of purposes.

I claim:

1. A gate valve comprising a casing having inlet and outlet openings connected by a fluid passage, a carriage reciprocable transversely of the fluid passage, means for moving the carriage, said carriage having a vertically elongate slot closed at its lower end and whose opposite walls are provided with inclined cam ribs, a head disposed within said slot, said head comprising sleeve members disposed end to end and means uniting the sleeve members, said sleeve members having opposed surfaces defining between them inclined grooves on opposite sides of the head which receive the respective cam ribs of the carriage, and a valve disc carried by the head, said cam ribs and inclined grooves cooperating to move the head with the valve disc in opposite directions.

2. A gate valve comprising a casing having a fluid passage provided with parallel guides at its opposite sides, a carriage engaging the guides and sliding transversely of the passage, means for moving the carriage, a valve head movable relatively to the carriage both in the direction of the sliding movement of the carriage and transversely thereto, said valve head comprising aligned sleeve members and a bolt uniting them, the sleeve members having opposed inclined guide surfaces defining the grooves and the carriage having cam ribs at opposite sides which engage the cam grooves of the head, said cam ribs and grooves being operable to move the valve head transversely to the path of movement of the carriage after a predetermined movement of the latter, and a stop upon said head engageable with a surface upon said casing to hold the head in sliding relation with said cam means during said last named movement.

3. A gate valve comprising a casing having a fluid passage, a carriage guided to slide transversely of the passage, said carriage having a slot elongate in the direction of its movement, parallel inclined cam elements upon the opposed inner walls of the slot, a valve head within the slot, said head comprising a pair of independent members having opposed inclined faces constituting cam elements for engagement with the cam elements of the carriage, means uniting said independent members of the head, and means for limiting movement of the valve head with the carriage whereby upon subsequent movement of the carriage the cooperating cam elements constrain the valve head to move transversely of the direction of movement of the carriage.

4. A gate valve comprising a casing having a fluid passage, a carriage movable transversely of the passage, the carriage having an opening therethrough, and a two-piece valve head slidable in the opening, said head comprising a central portion having a sliding fit between the walls of the opening, and enlarged end portions, one of said end portions constituting a stop to limit movement of the head with the carriage and the other constituting a protective housing for a valve disc, a valve disc in said housing, and a bolt uniting the two pieces constituting the valve head, said bolt also retaining the disc within the housing.

5. A gate valve comprising a casing having a fluid passage and an annular valve seat, a valve disc cooperable with the seat, and a valve head supporting the valve disk, said head comprising complemental members of substantially cylindrical form, one of said members having a shallow cup-like housing at one end for the reception of the valve disc, and a bolt securing the complemental cylindrical members in end to end relation, said bolt having a flanged head loosely engaging a socket in the disc whereby to retain the latter within the housing.

6. A gate valve comprising a casing having a fluid passage and an annular valve seat, a valve disc cooperable with the seat, and a head supporting the valve comprising sleeve members arranged in end to end relation, and a bolt extending axially through the sleeve members and securing them in position, the remote ends of said sleeve members being furnished with flange members one of which is shaped to provide a housing for the valve disc.

7. A gate valve comprising a casing having a fluid passage and an annular valve seat, a valve disc cooperable with the seat, a disc supporting head comprising coaxial sleeve members, a bolt holding the sleeve members in end to end relation, one of said members having a chamber at its outer end for the reception of the disc, and means carried by the bolt engaging the disc to retain the latter within the chamber.

8. A gate valve having a valve disc and a disc supporting head comprising a sleeve member having a chamber at one end for the reception of the disc, the latter having a socket in its inner face, and a bolt disposed axially within the sleeve having an enlargement engaging the socket to hold the disc in operative position.

9. A gate valve having a valve disc and a head supporting the disc comprising a pair of sleeve members disposed in end to end relation, one of said members having a chamber at its outer end for the reception of the disc, and a bolt extending axially through the sleeves to hold them in assembled relation, the bolt having an extension projecting from its head loosely engaging a socket in the inner part of the disc.

10. A gate valve having a valve disc and a disc-supporting head comprising a housing forming a chamber for the reception of the disc, a retaining member projecting axially into the chamber and having an enlargement at its end, and a flange at the inner side of the disc forming a socket for the reception of the enlarged end of the retaining member.

11. A gate valve having a valve disc and a head supporting the disc having a shallow cup-like chamber for the reception of the disc, a retaining member projecting axially from the bottom of the chamber and having an enlargement at its end, and a lipped flange at the inner face of the disc forming a socket for the reception of the enlarged end of the retainer, said flange being cut away at one side to permit removal of the disc.

12. A gate valve having a valve disc and a head supporting it, said head comprising a pair of coaxial sleeve members disposed end to end, the meeting ends of the sleeve members being complementally inclined to their common axis, and means for securing the sleeves together and for connecting the disc to one of the sleeves, the meeting ends of the sleeves being shaped to provide diametrically opposed parallel cam slots inclined at the same angle as the meeting ends of the sleeve members, said slots being arranged to receive cam ribs of an actuating device.

Signed by me at Boston, Massachusetts, this 30th day of April, 1926.

BELVIN T. WILLISTON.